(12) United States Patent
Yoshida

(10) Patent No.: US 6,269,302 B1
(45) Date of Patent: Jul. 31, 2001

(54) SIMPLE MOBILE OBJECT POSITION DETECTING SYSTEM

(75) Inventor: Yasuharu Yoshida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/201,823

(22) Filed: Dec. 1, 1998

(30) Foreign Application Priority Data

Dec. 1, 1997 (JP) .................................................. 9-347147

(51) Int. Cl.[7] ............................. G01S 11/00; G08G 1/017
(52) U.S. Cl. ........................... 701/207; 701/117; 701/220; 340/928; 342/76
(58) Field of Search ..................................... 701/217, 220, 701/223, 117, 118, 207; 705/13; 340/928, 937, 938, 947, 943; 342/74, 76, 81, 454, 457

(56) References Cited

U.S. PATENT DOCUMENTS

| 3,774,209 | * | 11/1973 | Fleming et al. | 343/102 |
| 5,164,732 | * | 11/1992 | Brockelsby | 342/44 |
| 5,570,098 | * | 10/1996 | Searle et al. | 342/374 |
| 5,872,525 | * | 2/1999 | Fukasawa et al. | 340/928 |
| 5,973,638 | * | 10/1999 | Robbins et al. | 342/172 |

FOREIGN PATENT DOCUMENTS

| 50-62659 | 5/1975 | (JP) . |
| 53-40910 | 4/1978 | (JP) . |
| 61-216537 | 9/1986 | (JP) . |
| 2-92507 | 7/1990 | (JP) . |
| 4-190183 | 7/1992 | (JP) . |
| 4-215016 | 8/1992 | (JP) . |
| 6-230113 | 8/1994 | (JP) . |
| 9-16886 | 1/1997 | (JP) . |
| 9-287908 | 11/1997 | (JP) . |

OTHER PUBLICATIONS

English translation of Jananese Patent No. 06–230113.*
English translation of Japanese Patent No. 09–287908.*
A. Mitsuno et al., "Direction Finding Technology and Application to Radio–Communication Vehicle Identification System", NEC Technical Report, vol. 50, No. 7, pp. 147–155, 1997 (month is not available).
T. Nakahara et al., "Characteristics of Zigzag Slot Leakage Coaxial Cable", Fifty Anniversary Proc. of the Institute of Electronics and Communication Engineers, 1967 (month is not available).

* cited by examiner

Primary Examiner—Tan Nguyen
(74) Attorney, Agent, or Firm—Sughrue, Mion, Zinn, Macpeak & Seas, PLLC

(57) ABSTRACT

In a mobile object position detecting system for detecting a position of a mobile object having a transmitter, an elongated antenna system is provided for receiving a radio wave signal from the transmitter and outputting first and second electrical signals from first and second ends of the antenna system, respectively. A position detector calculates the position of the mobile object in accordance with a difference in time between the first and second electrical signals.

33 Claims, 16 Drawing Sheets

SIMPLE MOBILE OBJECT POSITION DETECTING SYSTEM

BACKGROUND OF THE INVENTION

1. Field of the Invention

The present invention relates to a mobile object position detecting system such as a vehicle position detecting system or a vehicle identification system

2. Description of the Related Art

Recently, various systems have been developed as intelligence transport system (ITSs). One of such systems is an electronic toll collection (ETC) system.

In the tollgates of an ETC system, determination of whether a vehicle is an ETC vehicle or a non-ETC vehicle is important. For realizing this, an ETC system is suggested (see: A. Mitsuno et al., "Direction Finding Technology and Application to Radio-communication Vehicle Identification System", NEC Technical Report, Vol, 50, No. 7, pp. 147–155, 1997). That is, a vehicle detector is provided for optically detecting whether or not a vehicle is present in a communication zone. In this case, the vehicle has an ETC transceiver. Also, a camera is provided to take a photograph of a vehicle. The transceiver is mounted on a dashboard of the vehicle.

Also, first and second antennas are installed in a row perpendicular to a lane on a pole. A signal is transmitted from the transceiver via the first antenna to a modulator/demodulator or vice versa. That is, the signal received at the first antenna from the transceiver is amplified, demodulated, and transmitted to a personal computer. On the other hand, a signal from the personal computer are modulated and transmitted from the first antenna to the transceiver.

A signal is supplied from the transceiver via the second antenna to a direction of angle (DOA) detector for calculating an angle of the vehicle. Each of the angles detected by the DOA detector is transmitted to the personal computer.

Further, a signal from the vehicle detectors is supplied to the personal computer, and the personal computer transmits a control signal to the camera.

The prior art ETC system will be explained later in detail.

In the prior art ETC system, however, the DOA detector is constructed on the basis of the principle of an interferometer (see FIG. 2 of the above-mentioned document). As a result, the DOA detector is large in size and high in cost. This also makes the ETC system large in size and high in cost.

SUMMARY OF THE INVENTION

It is an object of the present invention to provide a mobile object position detecting system such as a vehicle position detecting system capable of being small in size and low in cost.

According to the present invention, in a mobile object position detecting system for detecting a position of a mobile object having a transmitter, an elongated antenna system is provided for receiving a radio wave signal from the transmitter and outputting first and second electrical signals from first and second ends of the antenna system, respectively. A position detector calculates the position of the mobile object in accordance with a difference in time between the first and second electrical signals.

Also, according to the present invention, in a mobile object position detecting system for detecting a position of a mobile object having a transmitter, first and second antennas are located apart from each other, for receiving a radio wave signal from the transmitter and outputting first and second electrical signals, respectively. A position detector calculates the position of the mobile object in accordance with a difference in time between the first and second electrical signals.

BRIEF DESCRIPTION OF THE DRAWINGS

The present invention will be more clearly understood from the description as set below, as compared with the prior art, with reference to the accompanying drawings, wherein.

DESCRIPTION OF THE PREFERRED EMBODIMENTS

Before the description of the preferred embodiments, a prior art ETC system will be explained with reference to FIGS. 1, 2A, 2B, 2C, 2D and 2E (see: A. Mitsuno et al., "Direction Finding Technology and Application to Radio-communication Vehicle Identification System", NEC Technical Report, Vol. 50, No. 7, pp. 147–155, 1997).

Figure 1:
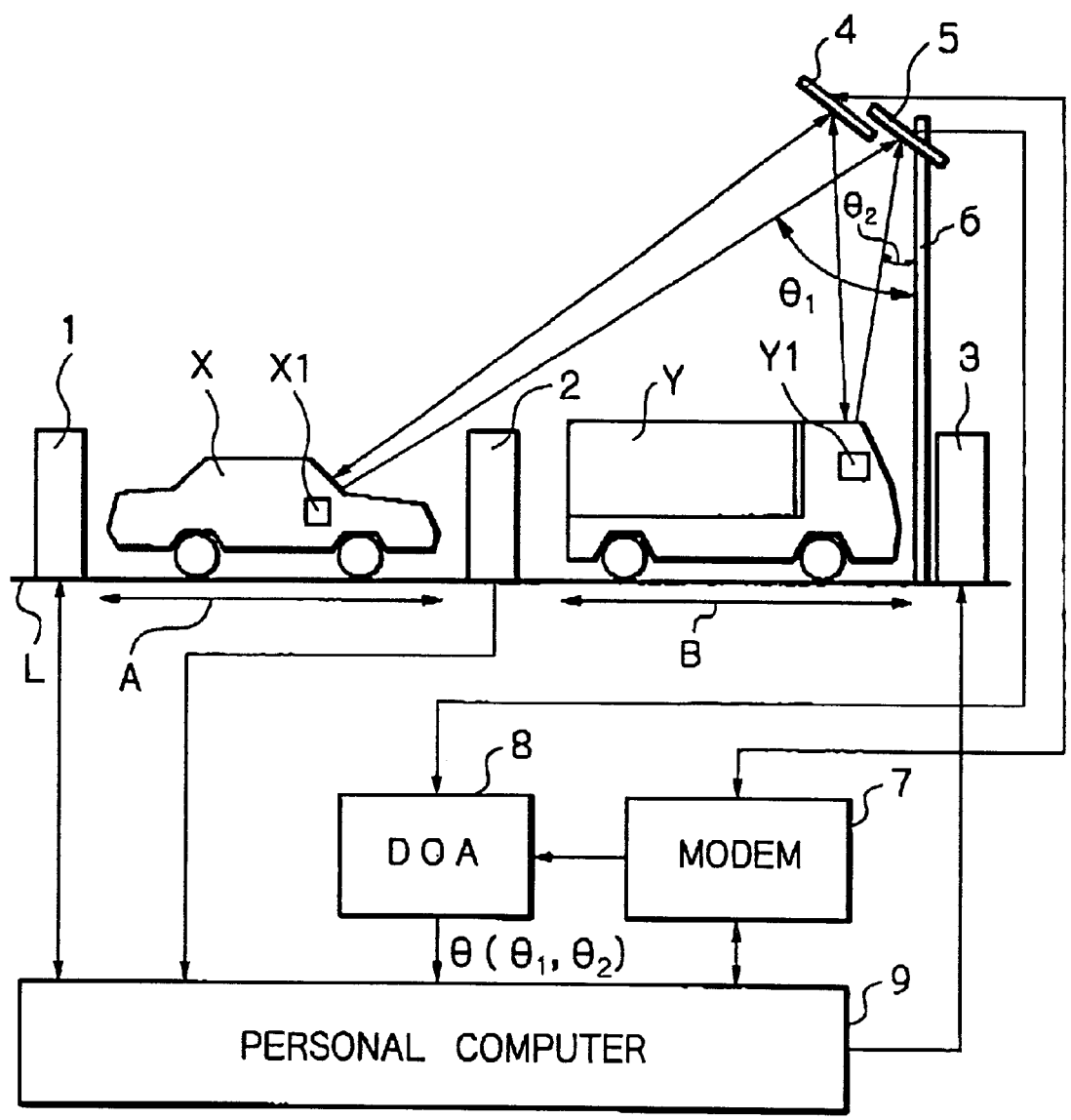
FIG. 1 is a diagram illustrating a prior art ETC system.

In FIG. 1, two communication zones A and B are provided in a single lane L. A vehicle detector 1 is provided for optically detecting whether or not a vehicle such as X is present in the communication zone A, and a vehicle detector 2 is provided for optically detecting whether or not a vehicle such as Y is present in the communication zone B. In this case, the vehicles X and Y have ETC transceivers X1 and Y1, respectively. Also, a camera 3 is provided to take a photograph of a vehicle.

The transceivers X1 and Y1 are mounted on dashboards of the vehicles X and Y, respectively.

Also, antennas 4 and 5 are installed in a row perpendicular to the lane L on a pole 6.

Signals are transmitted from the transceivers X1 and Y1 via the antenna 4 to a modulator/demodulator 7 or vice versa. That is, the signals received at the antenna 4 from the transceivers X1 and Y1 are amplified, demodulated, and transmitted to a personal computer 9. On the other hand, signals from the personal computer 9 are modulated and transmitted from the antenna 4 to the transceivers X1 and Y1.

Signals are supplied from the transceivers X1 and Y1 via the antenna 4 to a direction of angle (DOA) detector 8 for calculating angles θ of the vehicle X and Y. Each of the angles θ detected by the DOA detector 8 is transmitted to the personal computer 9.

Further, signals from the vehicle detectors 1 and 2 are supplied to the personal computer 9, and the personal computer 9 transmits a control signal to the camera 3.

The operation of the ETC system of FIG. 1 will be explained with reference to FIGS. 2A, 2B, 2C, 2D and 2E.

Figure 2A:
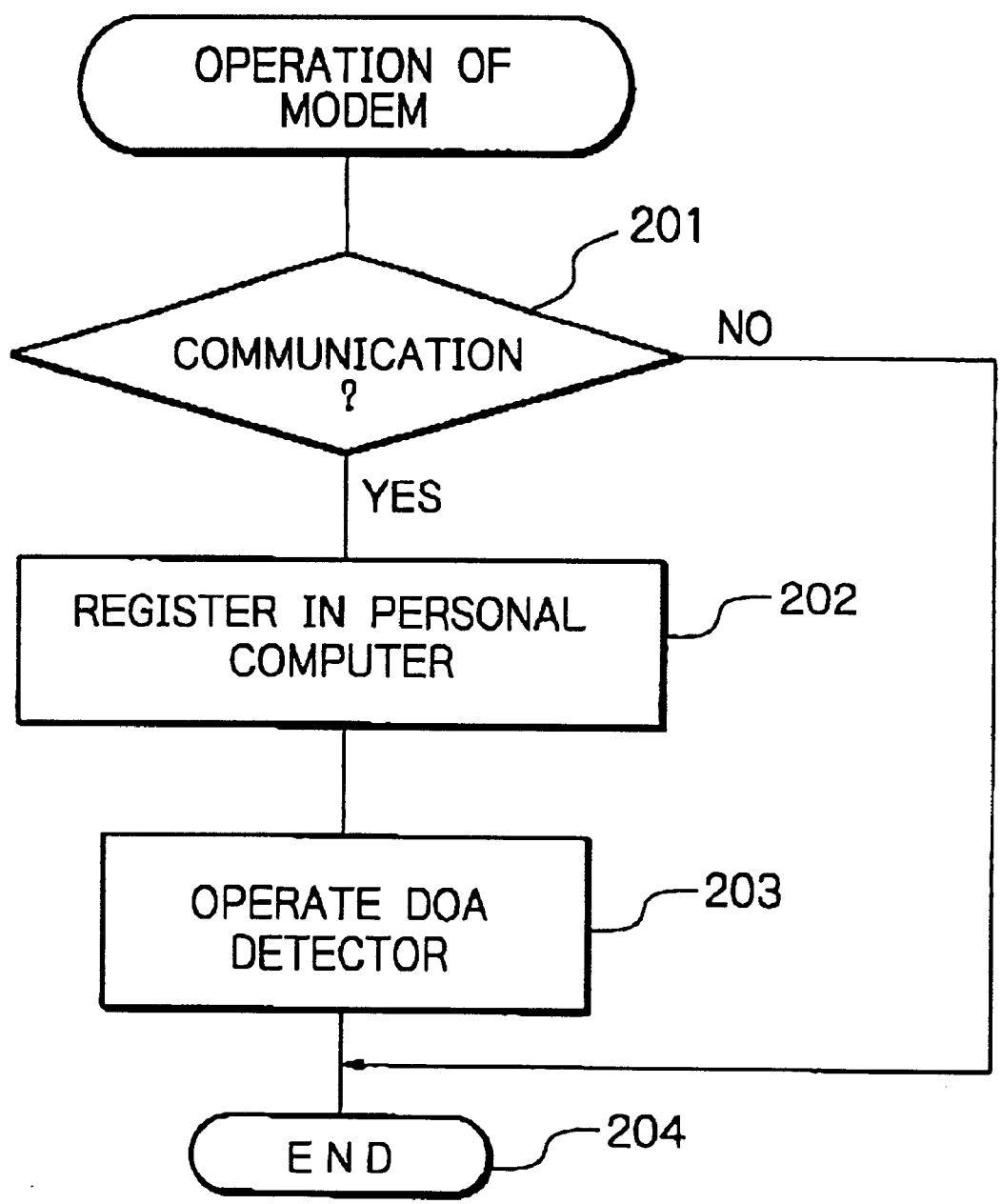
FIGS. 2A, 2B, 2D and 2E are flowcharts showing the operation of the ETC system of FIG. 1.

FIG. 2A is a flowchart showing the operation of the modulator/demodulator 7 of FIG. 1. That is, at step 201, it is determined whether or not a communication with a vehicle or its transceiver is established. Only when such a communication is established, does the control proceed to step 202. Otherwise, the control proceeds directly to step 204. At step 202, the communication is registered in the personal computer 9, and at step 203, a sampling signal is generated and transmitted to the DOA detector 8, thus operating the DOA detector 8.

Figure 2B:
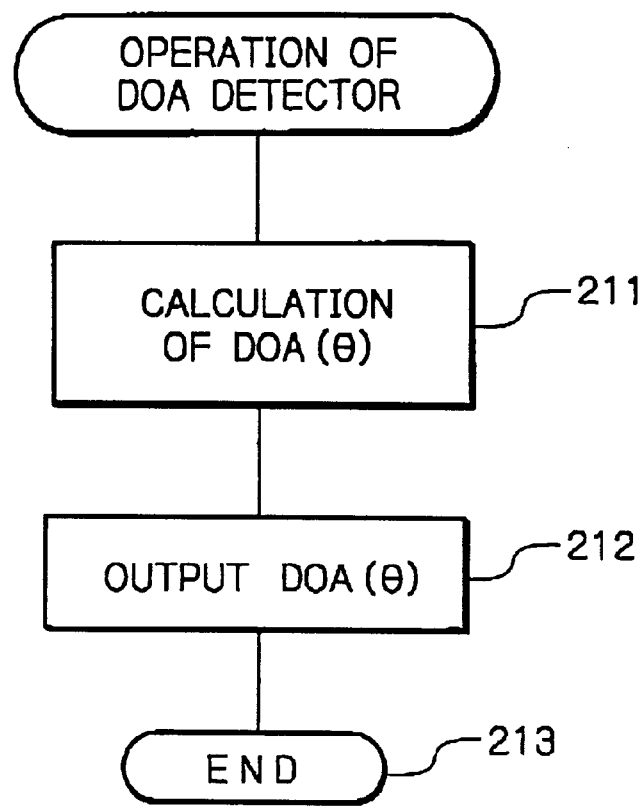
Figure 2C:
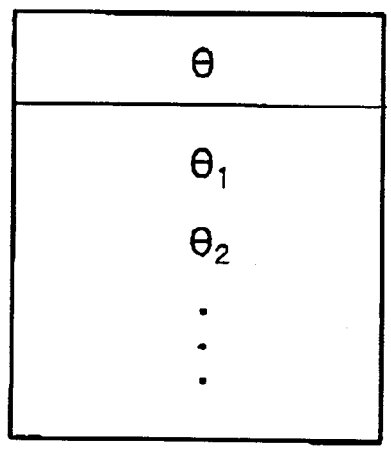
FIG. 2C is a diagram showing a table of the vehicle angle stored in a memory of the personal computer of FIG. 1.

FIG. 2B is a flowchart showing the operation of the DOA detector 8 of FIG. 1. That is, upon receipt of a sampling signal from the modulator/demodulator 7, at step 211, a vehicle angle θ is calculated, and at step 212, the calculated vehicle angle θ is transmitted to the personal computer 9. Thus, the operation of the DOA detector 8 is completed by step 213. Note that, when the personal computer 9 receives the vehicle angle θ, the vehicle angle θ is written into a table as shown in FIG. 2C. The values of the table are sequentially renewed.

Figure 2D:
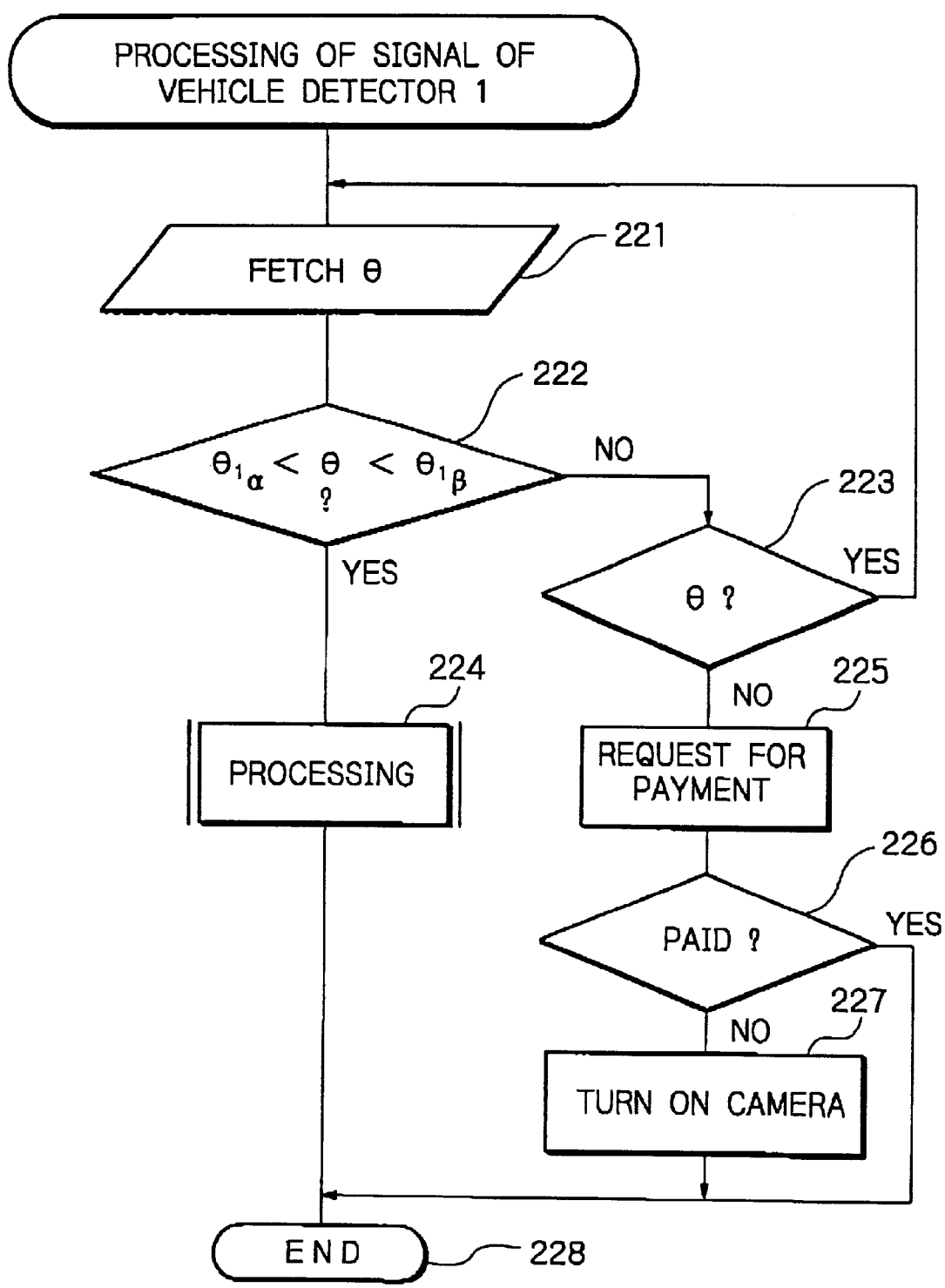

FIG. 2D is a flowchart showing the operation of the personal computer 9 of FIG. 1 where the output signal of the vehicle detector 1 optically detects that a vehicle is in an ON state. That is, at step 221, the vehicle angle θ is fetched from the table as shown in FIG. 2C. Then, at step 222, it is determined whether or not $\theta_{1\alpha} < \theta < \theta_{1\beta}$ is satisfied.

In this case, $\theta_{1\alpha}$ and $\theta_{1\beta}$ are threshold values for defining the communication zone A. Step 223 repeats the operations at steps 221 and 222 for all the angles θ stored in the table. If the determination at step 222 is affirmative which means that an ETC vehicle is in the communication zone A, the control proceeds to step 224, which recognizes such an ETC vehicle, calculates a toll, carries out a charging process, and so on. On the other hand, if the determination at step 222 for all the vehicle values θ is negative which means that a non-ETC vehicle is in the communication zone A, the control proceeds to step 225 which turns ON a display unit (not shown) to request a driver of the non-ETC vehicle to pay a toll. In this case, if the toll is not paid, the control proceeds via step 226 to step 227 which turns ON the camera 3 so that this non-ETC vehicle is taken a photograph of. Thus, the routine of FIG. 2D is completed by step 228.

Figure 2E:
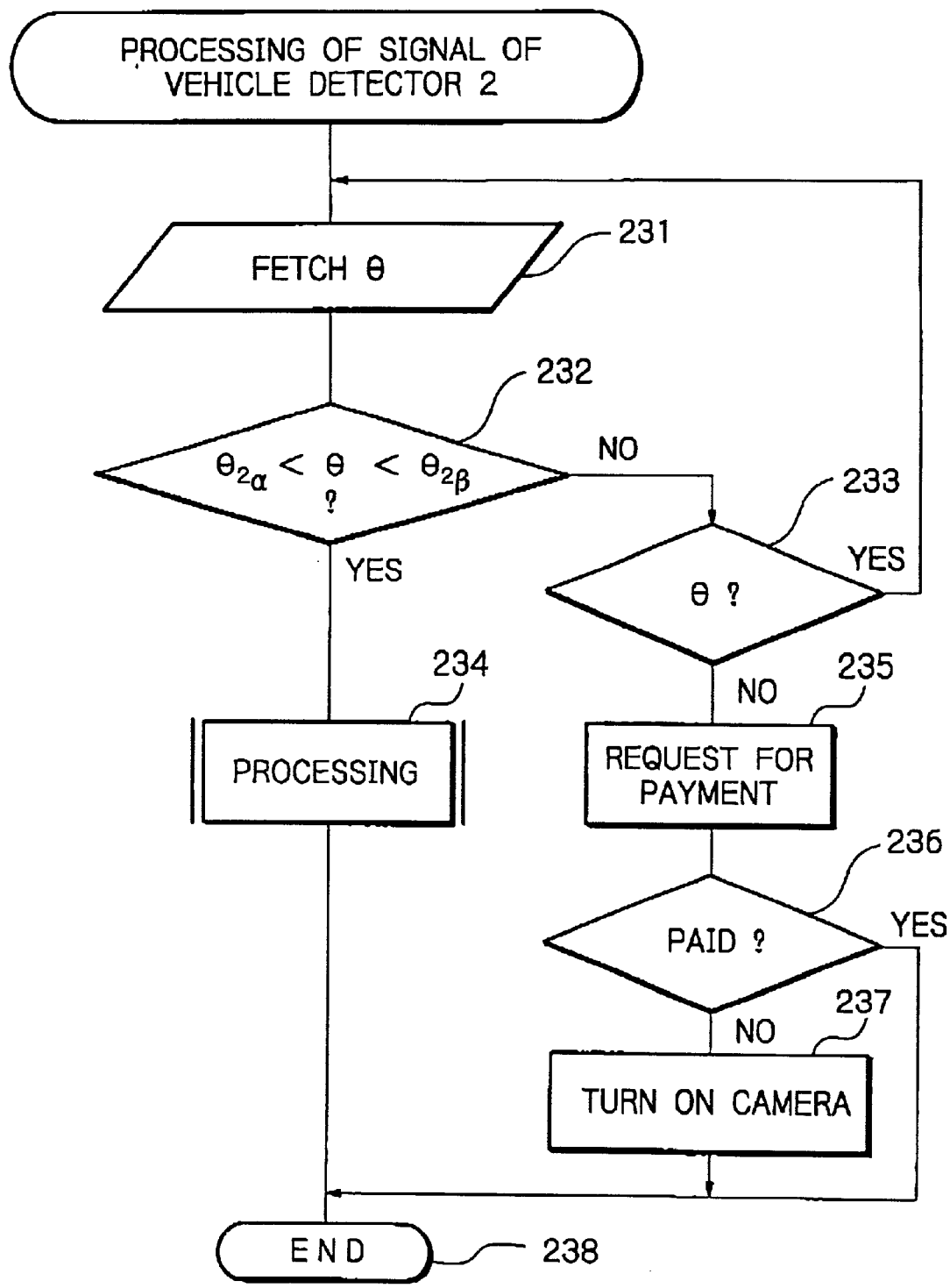

FIG. 2E is a flowchart showing the operation of the personal computer 9 of FIG. 1 where the output signal of the vehicle detector 2 optically detects that a vehicle is in an ON state. That is, at step 231, the vehicle angle θ is fetched from the table as shown in FIG. 2C. Then, at step 232, it is determined whether or not $\theta_{2\alpha} < \theta < \theta_{2\beta}$ is satisfied. In this case, $\theta_{2\alpha}$ and $\theta_{2\beta}$ are threshold values for defining the communication zone B. Step 233 repeats the operations at steps 231 and 232 for all the angles θ stored in the table. If the determination at step 232 is affirmative which means that an ETC vehicle is in the communication zone B, the control proceeds to step 234, which recognizes such an ETC vehicle, calculates a toll, carries out a charging process, and so on. On the other hand, if the determination at step 232 for all the vehicle values θ is negative which means that a non-ETC vehicle is in the communication zone B, the control proceeds to step 235 which turns ON the display unit (not shown) to request a driver of the non-ETC vehicle to pay a toll. In this case, if the toll is not paid, the control proceeds via step 236 to step 237 which turns On the camera 3 so that this non-ETC vehicle is taken a photograph of. Thus, the routine of FIG. 2E is completed by step 238.

In the ETC system of FIG. 1, however, the DOA detector 8 is constructed on the basis of the principle of an interferometer. That is, the DOA detector 8 is constructed by at least two antenna elements, at least to phase detectors connected to the antenna elements, analog/digital (A/D) converters connected to the phase detectors, and a digital signal processor connected to the A/D converters (see FIG. 2 of the above-mentioned document). As a result, the DOA detector 8 is large in size and high in cost.

Figure 3:
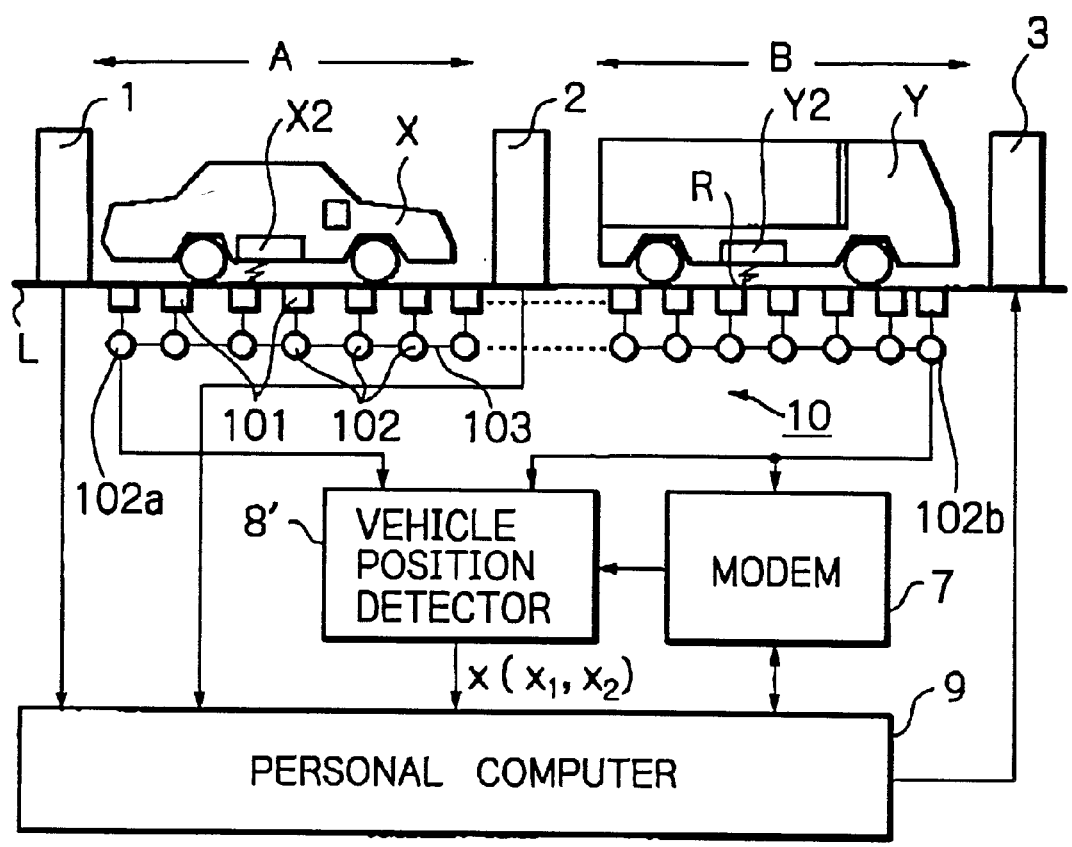
FIG. 3 is a diagram illustrating a first embodiment of the ETC system according to the present invention.
Figure 4:
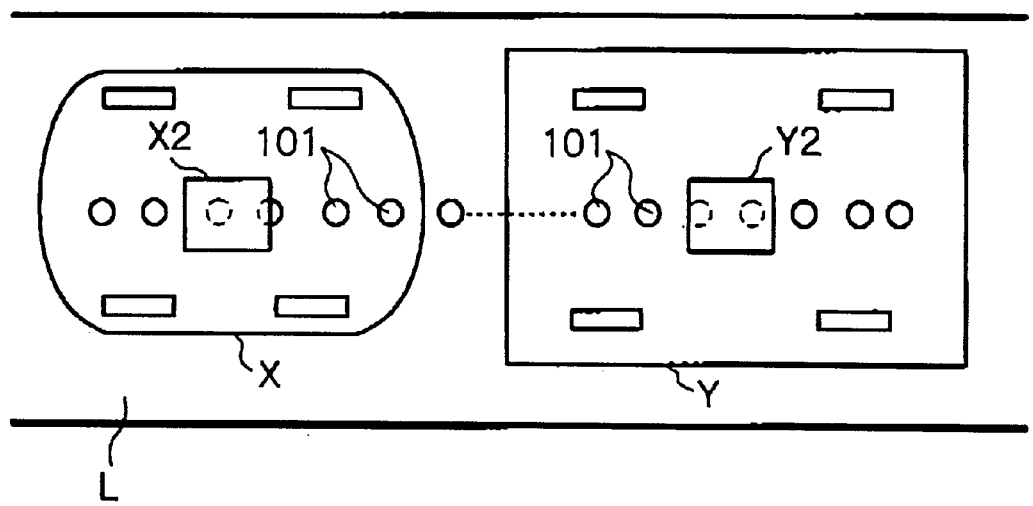
FIG. 4 is a plan view of the ETC system of FIG. 3.

FIG. 3 is a diagram illustrating a first embodiment of the ETC system according to the present invention, and FIG. 4 is a plan view of the ETC system of FIG. 3. In FIGS. 3 and 4, an antenna system 10 is provided instead of the antennas 4 and 5 and the pole 6 of FIG. 1, and a vehicle position detector 8' is provided instead of the DOA detector 8 of FIG. 1. Further, the vehicles X and Y have transceivers X2 and Y2 mounted on the bottoms thereof; however, the transceivers X2 and Y2 can be mounted on the front or rear portions of the vehicles X and Y, respectively.

The antenna system 10 is buried in the ground of the lane L. The antenna system 10 is constructed by a plurality of antenna elements 101 in a row along the lane L as illustrated in FIG. 4, a plurality of branching/combining units 102 connected to the antenna elements, and a plurality of cables 103 connecting the branching/combining units 102 in series to each other. The antenna elements 101 are exposed on the ground of the lane L.

The modulator/demodulator 7 is connected to an end of the antenna system 10, i.e., the branching/combining unit 102b, while the vehicle position detector 8' is connected to two ends of the antenna system 10, i.e., the branching/combining units 102a and 102b.

The transceivers X2 and Y2 generate carrier waves modulated by modulation signals from their antenna elements (not shown). These carrier waves are received by the antenna system 10, so that the vehicle detector 8' calculates a position of each of the vehicles X and Y in accordance with the difference in time between output signals from the branching/combining units 102a and 102b.

The vehicle position detector 8' will be explained next in detail with reference to FIG. 5.

Figure 5:
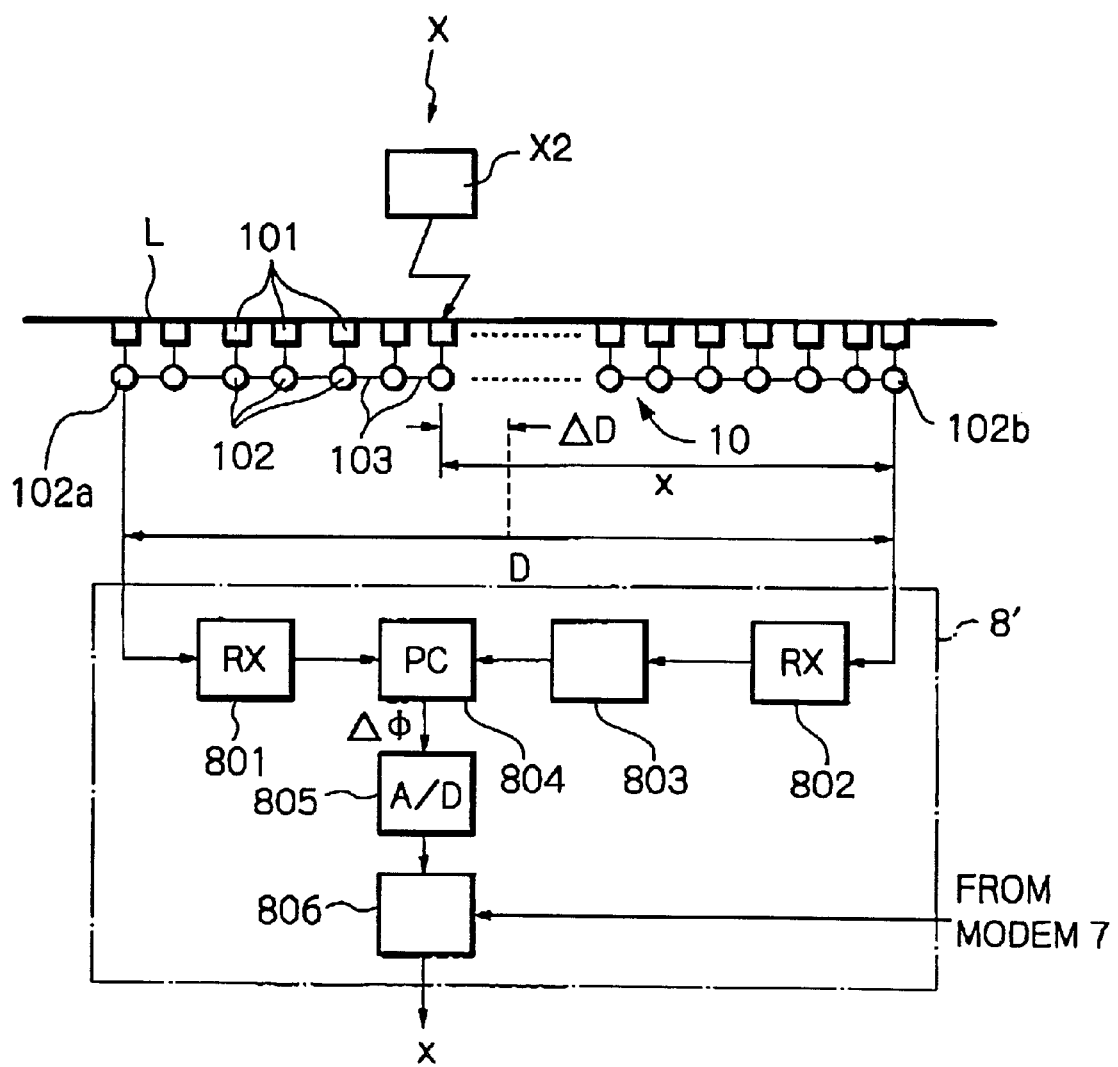
FIG. 5 is a detailed circuit diagram of the vehicle position detector of FIG. 3.

In FIG. 5, the vehicle position detector 8' is constructed by a receiver 801 for extracting a modulation signal from the output signal of the branching/combining unit 102a, a receiver 802 for extracting a modulation signal from the output signal of the branching unit 102b, an initial phase adjusting unit 803 connected to the receiver 802, a phase comparator 804 for detecting a phase difference Δφ between the modulation signals from the receivers 801 and 802, and A/D converter 805 for performing an A/D conversion upon the phase Δφ, and a position calculating unit 806 for calculating a distance x of a vehicle such as X in accordance with the output signal of the A/D converter 805.

The initial phase adjusting unit 803 adjusts the phase of the output signal of the receiver 802, so that the phase difference Δϕ becomes zero when the vehicle X is positioned at a center between the branching/combining units 102*a* and 102*b*, i.e., $$X+D/2$$

where x is the distance between the branching/combining unit 102*b* and the vehicle X, and D is the distance between the branching/combining unit 102*b* and the branching/combining unit 102*a*.

Note that the initial phase adjusting unit 803 can be connected between the receiver 801 and the phase comparator 804.

The position calculating unit 806 can be constructed by a microcomputer and is operated by receiving a sampling signal from the modulator/demodulator 7.

The principle of the vehicle position detector 8' is explained next. That is, the distance x of the vehicle X is represented by $$x=D/2+\Delta D \quad (1)$$

where ΔD is the difference between the distance x and the value D/2.

Also, the difference ΔD is represented by $$\Delta D = k \cdot \Delta \tau \quad (2)$$

where Δτ is the difference in signal propagation time between the distance x and the distance (D−x), and k is a constant determined by a propagation speed of signals within the antenna system Further, the time difference Δτ is represented by $$\Delta \tau = \Delta \phi / \omega \quad (3)$$

where Δϕ is the phase difference generated from the phase comparator 804, and

106 is the angular frequency of the modulation signals output from the receivers 801 and 802.

From the equations (1), (2) and (3), $$x = D/2k \cdot (\Delta \phi / \omega) \quad (4)$$

Thus, the position calculating unit 806 calculates the distance x using the phase difference Δϕ on a basis of the equation (4).

The operation of the ETC system of FIG. 3 will be explained next with reference to FIGS. 6A, 6B, 6C, 6D and 6E.

Figure 6A:
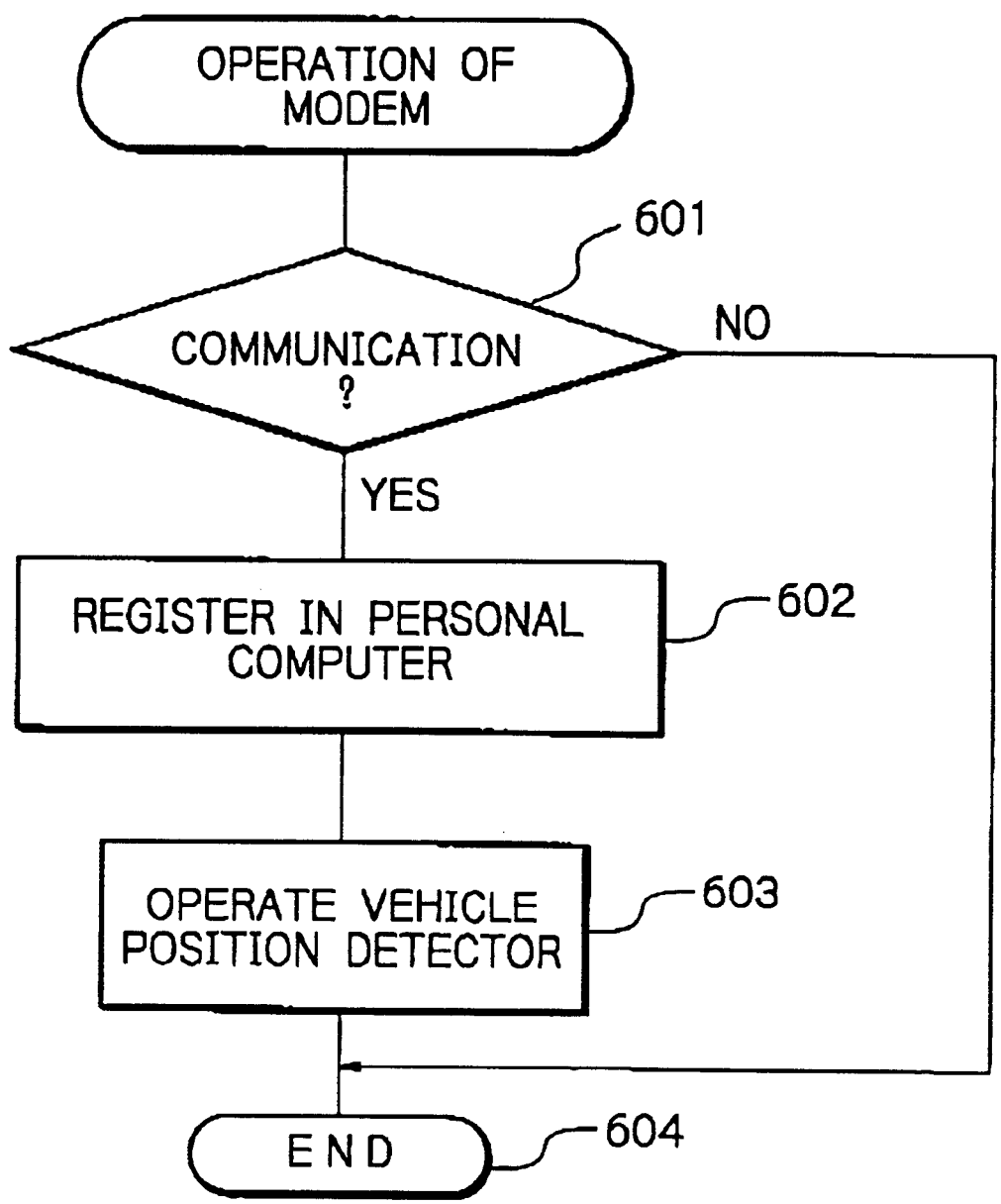
FIGS. 6A, 6B, 6D and 6E are flowcharts showing the operation of the ETC system of FIG. 3.

FIG. 6A is a flowchart showing the operation of the modulator/demodulator 7 of FIG. 3. That is, at step 601, it is determined whether or not a communication with a vehicle or its transceiver is established. Only when such a communication is established, does the control proceed to step 602. Otherwise, the control proceeds directly to step 604. At step 602, the communication is registered in the personal computer 9, and at step 603, a sampling signal is generated and transmitted to the vehicle position detector 8', thus operating the vehicle position detector 8'.

Figure 6B:
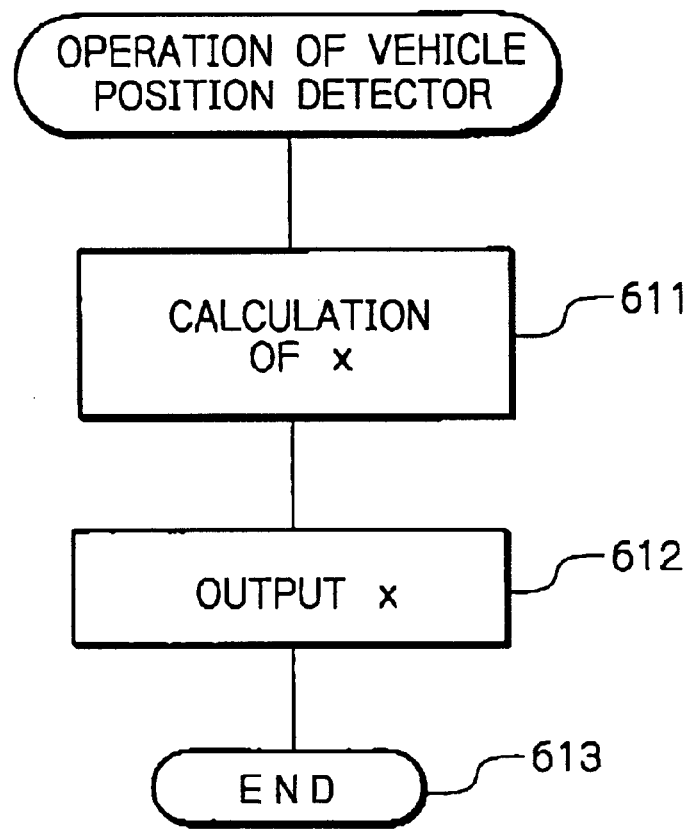
Figure 6C:
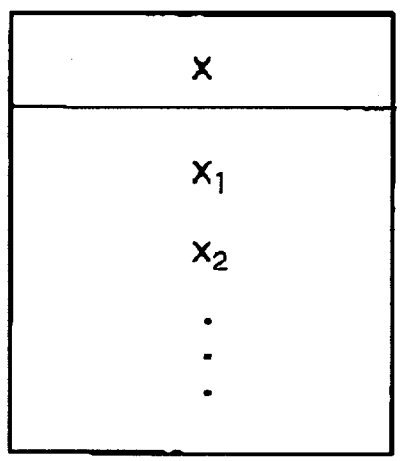
FIG. 6C is a diagram showing a table of the vehicle position stored in a memory of the personal computer of FIG. 3.

FIG. 6B is a flowchart showing the operation of the vehicle position detector 8' of FIG. 3. That is, upon receipt of a sampling signal from the modulator/demodulator 7, at step 611, a vehicle position (distance) x is calculated, and a step 612, the calculated vehicle position x is transmitted to the personal computer 9. Thus, the operation of the vehicle position detector 8' is completed by step 613. Note that, when the personal computer 9 receives the vehicle position x, the vehicle angle x is written into a table as shown in FIG. 6C. The values of the table are sequentially renewed.

Figure 6D:
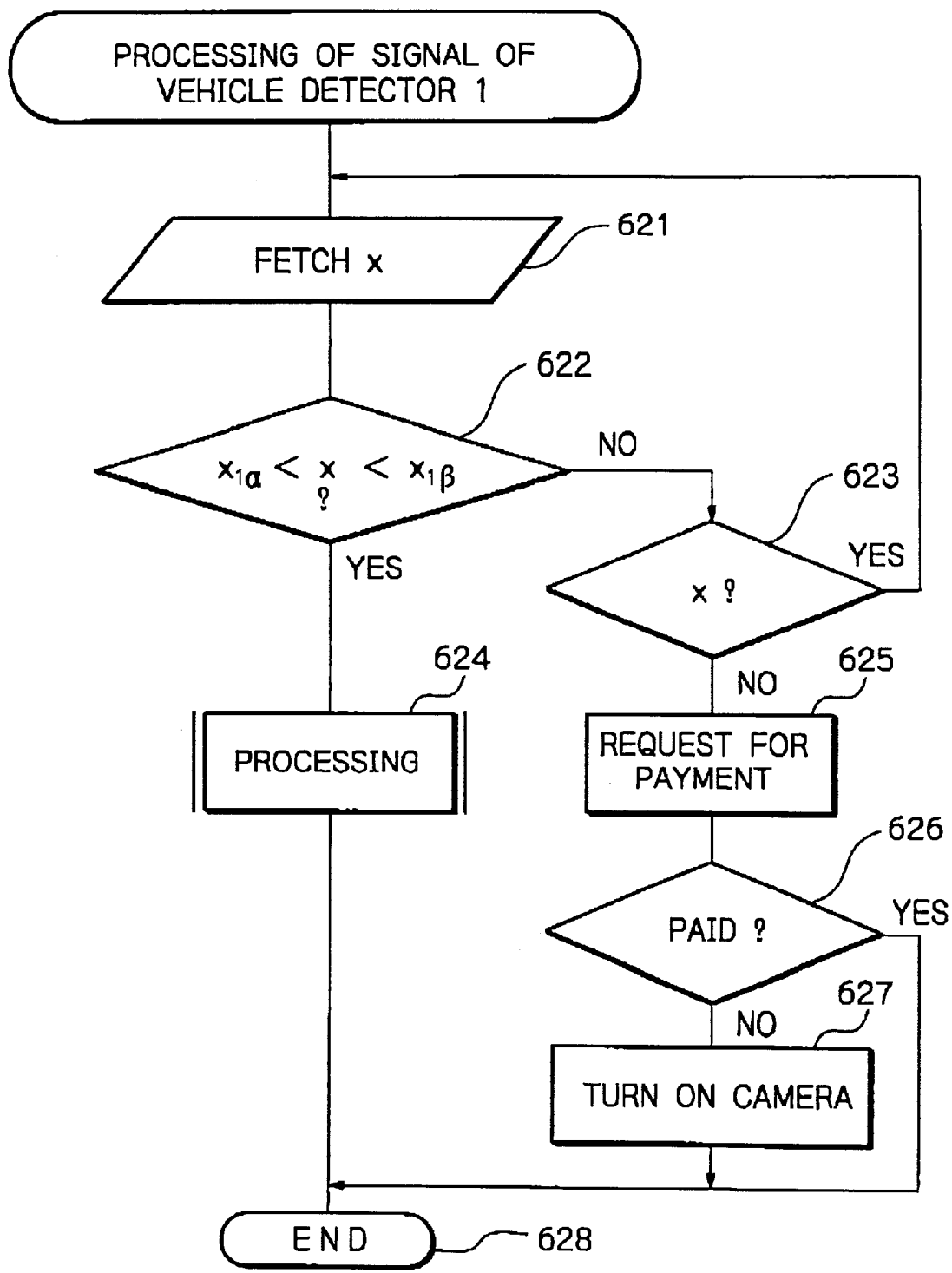

FIG. 6D is a flowchart showing the operation of the personal computer 9 of FIG. 3 where the output signal of the vehicle detector 1 optically detects that a vehicle is in an ON state. That is, at step 621, the vehicle position x is fetched from the table as shown in FIG. 6C. Then, at step 622, it is determined whether or not $x_{1\alpha} < x < x_{1\beta}$ is satisfied. In this case, $x_{1\alpha}$ and $x_{1\beta}$ are threshold values for defining the communication zone A. Step 623 repeats the operations at steps 621 and 622 for all the positions x stored in the table. If the determination at step 622 is affirmative which means that an ETC vehicle is in the communication zone A, the control proceeds to step 624, which recognizes such an ETC vehicle, calculates a toll, carries out a charging process, and so on. On the other hand, if the determination at step 622 for all the vehicle positions x is negative which means that a non-ETC vehicle is in the communication zone A, the control proceeds to step 625 which turns ON a display unit (not shown) to request a driver of the non-ETC vehicle to pay a toll. In this case, if the toll is not paid, the control proceeds via step 626 to step 627 which turns ON the camera 3 so that this non-ETC vehicle is taken a photograph of. Thus, the routine of FIG. 6D is completed by step 628.

Figure 6E:
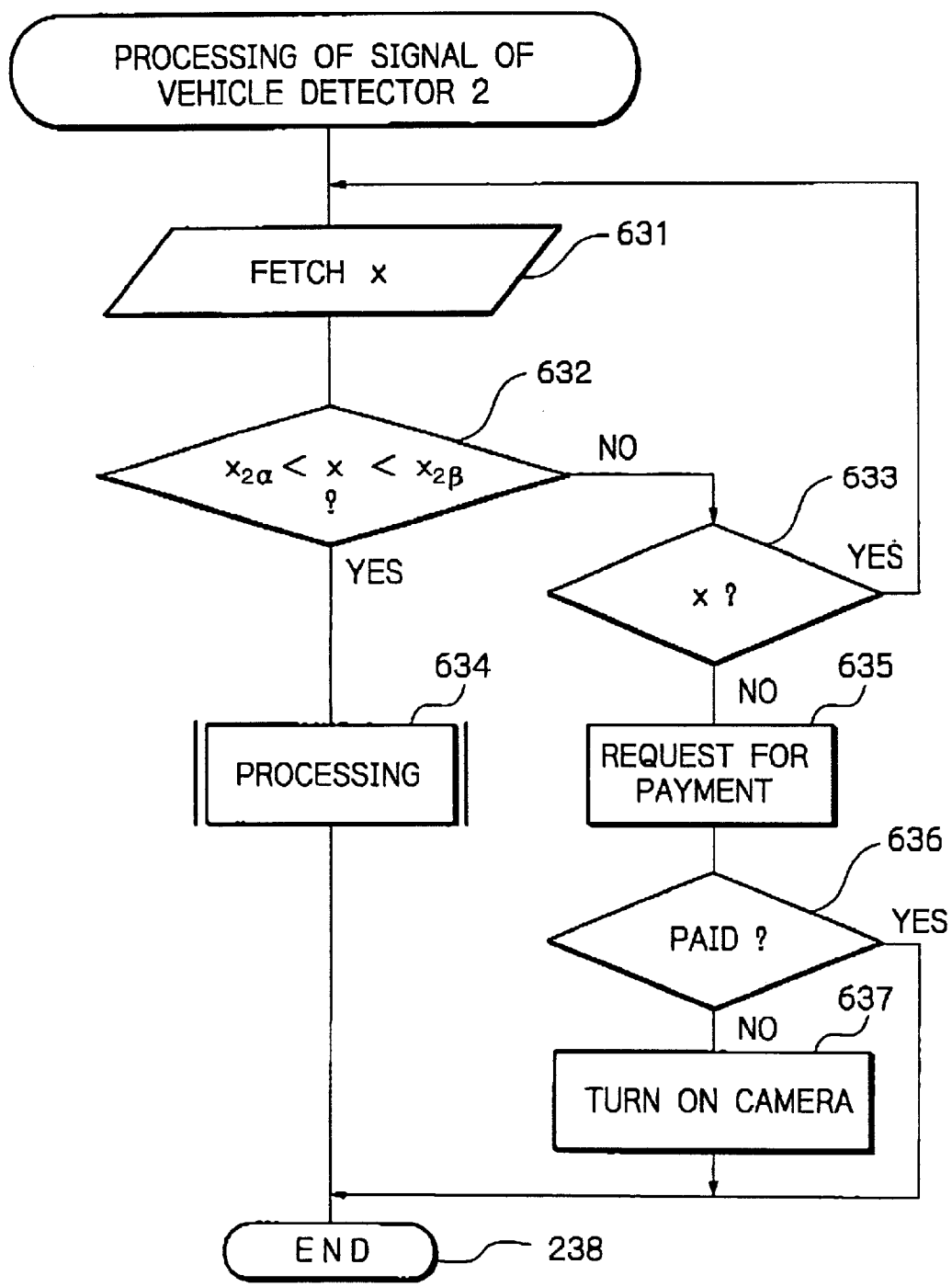

FIG. 6E is a flowchart showing the operation of the personal computer 9 of FIG. 3 where the output signal of the vehicle detector 2 optically detects that a vehicle is in an ON state. That is, at step 631, the vehicle position x is fetched from the table as shown in FIG. 6C. Then, at step 632, it is determined whether or not $x_{2\alpha} < x < x_{2\beta}$ is satisfied. In this case, $x_{2\alpha}$ and $x_{2\beta}$ are threshold values for defining the communication zone B. Step 633 repeats the operations at steps 631 and 632 for all the positions x stored in the table. If the determination at step 632 is affirmative which means that an ETC vehicle is in the communication zone B, the control proceeds to step 634, which recognizes such an ETC vehicle, calculates a toll, carries out a charging process, and so on. On the other hand, if the determination at step 632 for all the vehicle positions x is negative which means that a non-ETC vehicle is in the communication zone B, the control proceeds to step 635 which turns ON the display unit (not shown) to request a driver of the non-ETC vehicle to pay a toll. In this case, if the toll is not paid, the control proceeds via step 636 to step 637 which turns ON the camera 3 so that this non-ETC vehicle is taken a photograph of. Thus, the routine of FIG. 6E is completed by step 638.

In the first embodiment, the vehicle position detector 8' can be smaller in size and lower in lost than the DOA detector 8 of FIG. 1.

Also, since the transceivers X2 and Y2 of the vehicles X and Y are in proximity to the antenna elements 101 of the antenna system 10, it is possible to accurately detect the positions of the vehicles X and Y. Further, since a communication using weak radio waves can be carried out between the transceivers X2 and Y2 of the vehicles X and Y and the antenna elements 101 of the antenna system 10, the frequency of the transceivers X2 and Y2 can be arbitrarily determined which increases the freedom of design thereof.

Additionally, since the transceivers X2 and Y2 do not require a special modulation system, each of the transceivers X2 and Y2 can incorporate a transmitter commonly for transmitting radio waves for the modulator/demodulator 7 and the vehicle position detector 8', the transceivers X2 and Y2 can be reduced in cost. Similarly, the antenna system 10 is provided commonly for the modulator/demodulator 7 and the vehicle position detector 8', which simplifies the system. Further, the receiver 801 can be provided commonly for the receiver section of the modulator/demodulator 7, which also simplifies the system.

Figure 7:
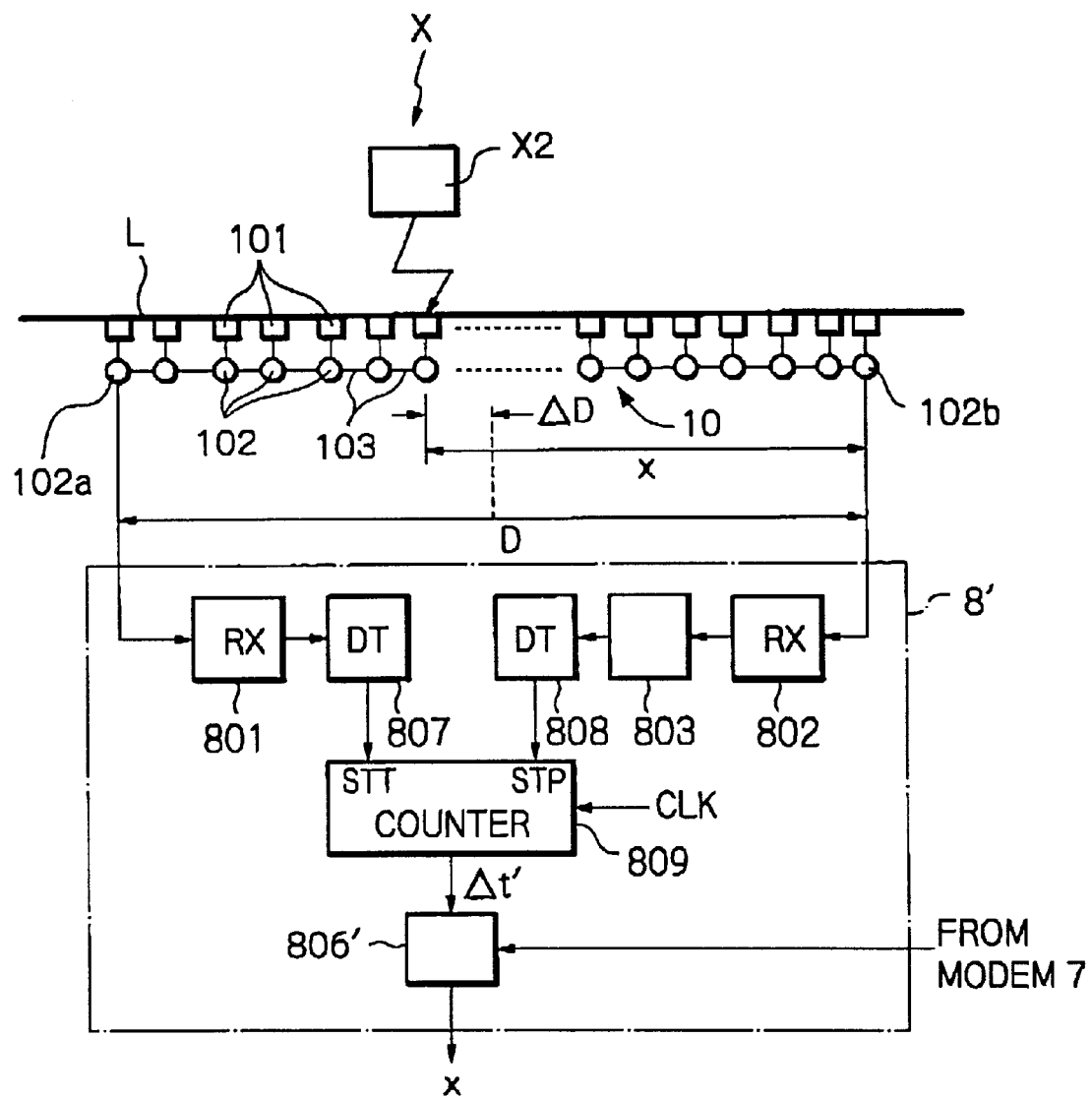
FIG. 7 is a circuit diagram illustrating a modification of the vehicle position detector of FIG. 5.

In FIG. 7, which is a modification of the vehicle position detector 8' of FIG. 5, rising edge detectors 807 and 808 and a counter 809 are provided instead of the phase comparator 804 and the A/D converter 805 of FIG. 5. Also, the position calculating unit 806 of FIG. 5 is modified into a position calculating unit 806'. That is, when the rising edge detector 807 generates a rising edge detection signal, the counter 809 starts to count pulses of a clock signal CLK. On the other hand, when the rising edge detector 808 generates a rising edge signal, the counter 809 stops its counting operation and transmits the content of the counter 809 to the position calculating unit 806'. Therefore, the content of the counter 809 shows a value in relation to the distance x. Thus, the position calculating unit 806' can calculates the distance x in accordance with the content of the counter 809.

Note that the rising edge detectors 807 and 808 of FIG. 7 can be replaced by falling edge detectors.

In more detail, the difference in time Δt of received signals between the receivers 801 and 802 is represented by $$\Delta t \propto (D/2 + \Delta D) - (D/2 - \Delta D) = 2 \cdot \Delta D \quad (5)$$

Figure 8:
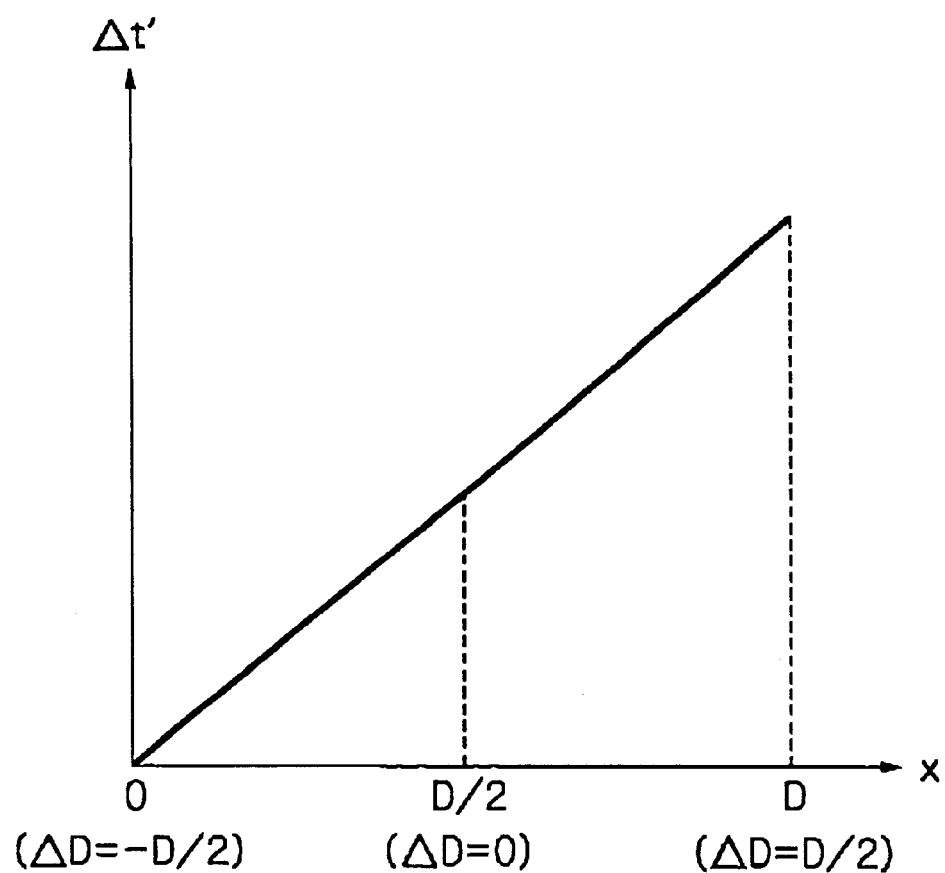
FIG. 8 is a graph showing the output characteristics of the counter of FIG. 7.

Here, assume that the delay time of the initial phase adjusting unit 803 is a time td corresponding to the distance D. Then, the difference in time Δt' between the output signals of the rising edge detectors 807 and 808 is represented by $$\Delta t' = \Delta t + td \propto 2 \cdot \Delta D + D \quad (6)$$

from equations (1) and (6), $$x = D/2 + (k' \cdot \Delta t' - D)/2 = k'' \cdot \Delta t' \quad (7)$$

where k'' is a constant. The relationship of the equation (7) is shown in FIG. 8. Thus, the position calculating unit 8' calculates the distance x using the counter value Δt' on the basis of the equation (7).

Figure 9:
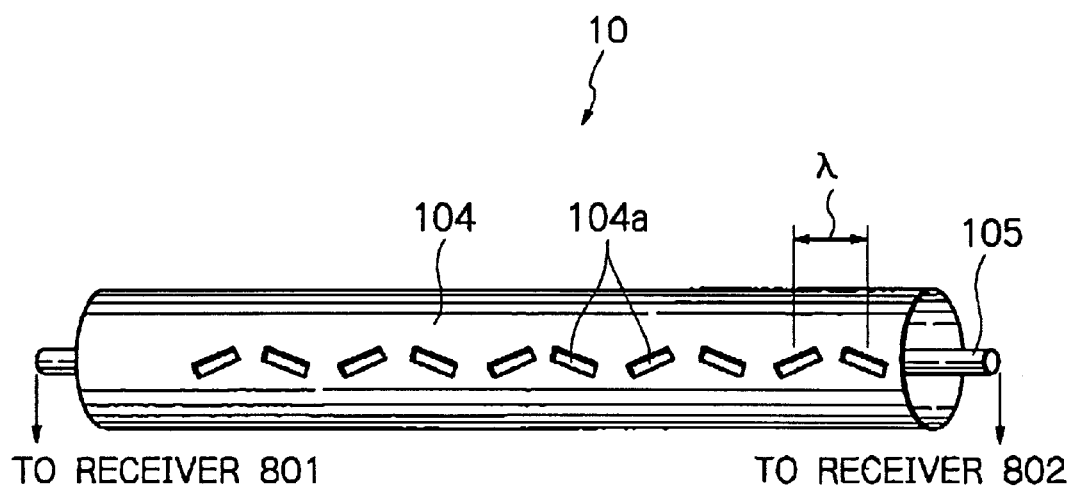
FIG. 9 is a diagram illustrating a modification of the antenna system of FIG. 3.

In FIG. 9, which illustrates a modification of the antenna system 10 of FIG. 3, the antenna system 10 includes a leakage coaxial conductor that is constructed by an outer conductor 104 and an inner conductor 105 within the outer conductor 104 (see: T. Nakahara et al., "Characteristics of Zigzag slot Leakage Coaxial Cable", Fifty Anniversary Proc. of The Institute of Electronics and Communications Engineers, 1967). Also, slots 104a are zigzag perforated on the external conductor 104 for radiating and receiving radio waves. The spacing between the slots 104a is about one wavelength λ of the modulation signals. The slots 104a improve the sensitivity of reception of radio waves. The conductors 104 and 105 are made of aluminum, and a helical antenna element (not shown) is wound on the conduction 105. This, the antenna system 10 of FIG. 10 emphasizes the leaky wave mode and suppresses the surface wave mode of basic waves.

Note that the leakage coaxial conductor of FIG. 9 can be replaced by a leakage waveguide.

Figure 10:
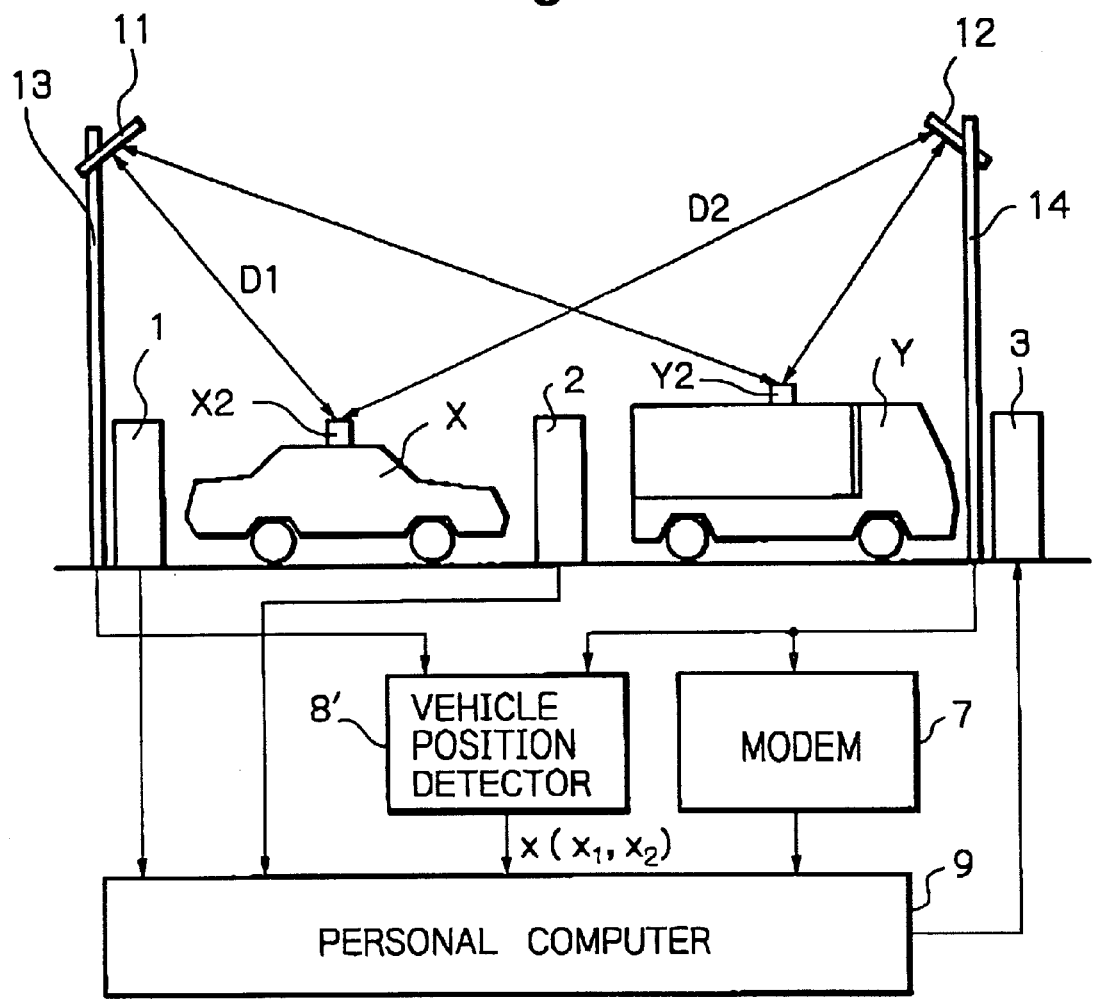
FIG. 10 is a diagram illustrating a second embodiment of the ETC system according to the present invention.

In FIG. 10, which illustrates a second embodiment of the ETC system according to the present invention, antennas 11 and 12 installed on poles 13 and 14, respectively are provided instead of the antenna system 10 of FIG. 3. That is, the antenna 11 is connected to the vehicle position detector 8', while the antenna 12 is connected to the modulator/demodulator 7 and the vehicle position detector 8'. Also, the transceivers X2 and Y2 are mounted on the roofs of the vehicles X and Y, respectively.

Since the difference between distance D1 from the vehicle X to the antenna 11 and the distance D2 from the vehicle X to the antenna 12 substantially conforms to 2ΔD of FIG. 5, the vehicle position detector 8' can detect the distance of a vehicle such as X in accordance with the difference in time between the received signals of the antennas 11 and 12. Of course, an error due to the height of the poles 13 and 14 is calculated in advance, so that the distance of the vehicle X can be completely corrected.

Also, if the modulator/demodulator 7 is connected to the antenna 11 in addition to the antenna 12 to adopt a site diversity configuration, the communication between the modulator/demodulator 7 and the vehicle can be further improved.

The present invention can be applied to a mobile object position detecting system other than the ETC system.

As explained hereinabove, according to the present invention, since a mobility position detecting unit such as the vehicle position detecting unit 8' can be small in size and low in cost, the mobile object position detecting system can be small in size and low in cost.

What is claimed is:

1. A mobile object position detecting system for detecting a position of a mobile object having a transmitter, comprising:

an elongated antenna system that receives a direct radio wave signal from said transmitter and outputs first and second electrical signals from first and second ends of said antenna system, respectively, wherein said elongated antenna system emphasizes a surface wave mode; and a position detector, coupled to the first and second ends of said antenna system, that calculates the position of said mobile object in accordance with a difference in time between said first and second electrical signals.

2. The system as set forth in claim 1, wherein said antenna system comprises:

a plurality of antenna elements coupled in series and closely arranged in a row; and a plurality of branching/combining units coupled in a series, each of said branching/combining units coupled to one of said antenna elements, said position detector coupled to two of said branching/combining units located at ends of the series of said branching/combining units.

3. The system as set forth in claim 1, wherein said position detector comprises:

first and second receivers coupled to said first and second ends, respectively, of said antenna system;

a phase comparator, coupled to said first and second receivers, that compares a phase of an output signal of said first receiver with a phase of an output signal of said second receiver; and a position calculating unit, coupled to said phase comparator, that calculates the position of said mobile object in accordance with an output signal of said phase comparator.

4. The system as set forth in claim 3, wherein said position detector further comprises an initial phase adjusting unit, coupled between said phase comparator and one of said first and second receivers.

5. The system as set forth in claim 4, wherein a delay time of said initial phase adjusting unit is determined so that the output signal of said phase comparator shows a phase difference between inputs of said phase comparator is zero when said mobile object is located at a center of said antenna system.

6. The system as set forth in claim 5, wherein said position detector calculates the position of said mobile object by $$D/2 + k \cdot (\Delta\phi/\omega)$$

where D is a distance between said first and second ends of said antenna system;

$\Delta\phi$ is the output signal of said phase comparator;

$\omega$ is an angular frequency of said first and second electrical signals; and k is a constant determined by a propagation speed of said first and second electrical signals.

7. The system as set forth in claim 1, wherein said position detector comprises:

first and second receivers coupled to said first and second ends, respectively, of said antenna system;

first and second edge detectors, coupled to said first and second receivers, respectively, to detect edges of output signals of said first and second receivers; and a counter coupled to said first and second edge detectors, to start a counting operation of pulses of a clock signal upon receipt of an output signal of one of said first and second edge detectors and to stop said counting operation upon receipt of an output signal of the other of said first and second edge detectors.

8. The system as set forth in claim 7, wherein said position detector further comprises an initial phase adjusting unit, coupled between one of said first and second receivers and one of said first and second edge detectors.

9. The processor as set forth in claim 8, wherein a delay time of said initial phase adjusting unit is determined so that the output value of said counter shows zero when said mobile object is located at one of said first and second ends of said antenna system.

10. The system as set forth in claim 1, wherein said antenna system comprises a leakage coaxial conductor constructed by an external conductor and a center conductor penetrating said external conductor, said external conductor having zigzag perforated slots.

11. The system as set forth in claim 10, wherein said leakage coaxial conductor comprises an outer conductor and an inner conductor within said outer conductor, said outer conductor having perforated slots.

12. The system as set forth in claim 11, wherein said perforated slots are zigzag.

13. The system as set forth in claim 1, wherein said antenna system comprises a leakage waveguide.

14. The system as set forth in claim 1, wherein said mobile object is a vehicle, so that said mobile object position detecting system is constructed as an electronic toll collection system.

15. The system of claim 1, wherein said antenna system is positioned at least one of directly below and in a path of said mobile object, and no soundproof wall is required.

16. A mobile object position detecting system for detecting a position of a mobile object having a transmitter, comprising:

first and second antennas, located apart from each other, that receives a radio wave signal from said transmitter and output first and second electrical signals, respectively; and a position detector, coupled to said first and second antennas, that calculates the position of said mobile object in accordance with a difference in time between said first and second electrical signals.

17. The system as set forth in claim 16, wherein said position detector comprises:

first and second receivers coupled to said first and second antennas, respectively;

a phase comparator, coupled to said first and second receivers, that compares a phase of an output signal of said first receiver with a phase of an output signal of said second receiver; and a position calculating unit, coupled to said phase comparator, that calculates the position of said mobile object in accordance with an output signal of said phase comparator.

18. The system as set forth in claim 17 wherein said position detector further comprises an initial phase adjusting unit, coupled between said phase comparator and one of said first and second receivers.

19. The system as set forth in claim 18, wherein a delay time of said initial phase adjusting unit is determined so that the output signal of said phase comparator shows a phase difference between inputs of said phase comparator is zero when said mobile object is located at a center of said antenna system.

20. The system as set forth in claim 19, wherein said position detector calculates the position of said mobile object by $$D/2 + k \cdot (\Delta\phi/\omega)$$

where D is a distance between said first and second antennas;

$\Delta\phi$ is the output signal of said phase comparator;

$\omega$ is an angular frequency of said first and second electrical signals; and k is a constant determined by a propagation speed of said first and second electrical signals.

21. The system as set forth in claim 16, wherein said position detector comprises:

first and second receivers coupled to said first and second antennas, respectively;

first and second edge detectors, coupled to said first and second receivers, respectively, to detect edges of output signals of said first and second receivers; and a counter coupled to said first and second edge detectors, to start a counting operation of pulses of a clock signal upon receipt of an output signal of one of said first and second edge detectors and to stop said counting operation upon receipt of an output signal of the other of said first and second edge detectors.

22. The system as set forth in claim 21, wherein said position detector further comprises an initial phase adjusting unit, coupled between one of said first and second receivers and one of said first and second edge detectors.

23. The system as set forth in claim 22, wherein a delay time of said initial phase adjusting unit is determined so that the output value of said counter shows zero when said mobile object is located at one of said first and second antennas.

24. The system as set forth in claim 16, wherein said mobile object is a vehicle, so that said mobile object position detecting system is constructed as an electronic toll collection system.

25. A method of detecting a position of a mobile object, comprising:

establishing communication with the mobile object via a first portion of an antenna system substantially positioned in a path of travel of said mobile object;

registering said communication in a personal computer; and generating said transmitting a sampling signal to a position detector, wherein said sampling signal is determined by calculating a mobile object position.

26. The method of claim 25, further comprising receiving said calculated mobile object position in said personal computer and comparing said calculated mobile object position to a predetermined range of values.

27. The method of claim 26, further comprising completing a transaction for said mobile object if said calculated mobile object position falls within said predetermined range.

28. The method of claim 27, wherein said completing said transaction comprises electronically collecting a toll.

29. The method of claim 27, further comprising imaging and identifying said mobile object.

30. The method of claim 26, further comprising requesting an operator of said mobile object to complete a task if said calculated vehicle position does not fall within said predetermined range.

31. The method of claim 25, further comprising simultaneously conducting said determining, registering and generating steps to calculate an adjacent mobile object position for an adjacent mobile object positioned proximally to said mobile object via a second portion of said antenna system.

32. The method of claim 31, further comprising computing a distance between said mobile object and said adjacent mobile object in accordance with said calculated adjacent method object position.

33. The method of claim 25, further comprising detecting a phase difference between an input signal received from said mobile object and a second object to determine a distance between said first mobile object and said second object.

* * * * *